UNITED STATES PATENT OFFICE.

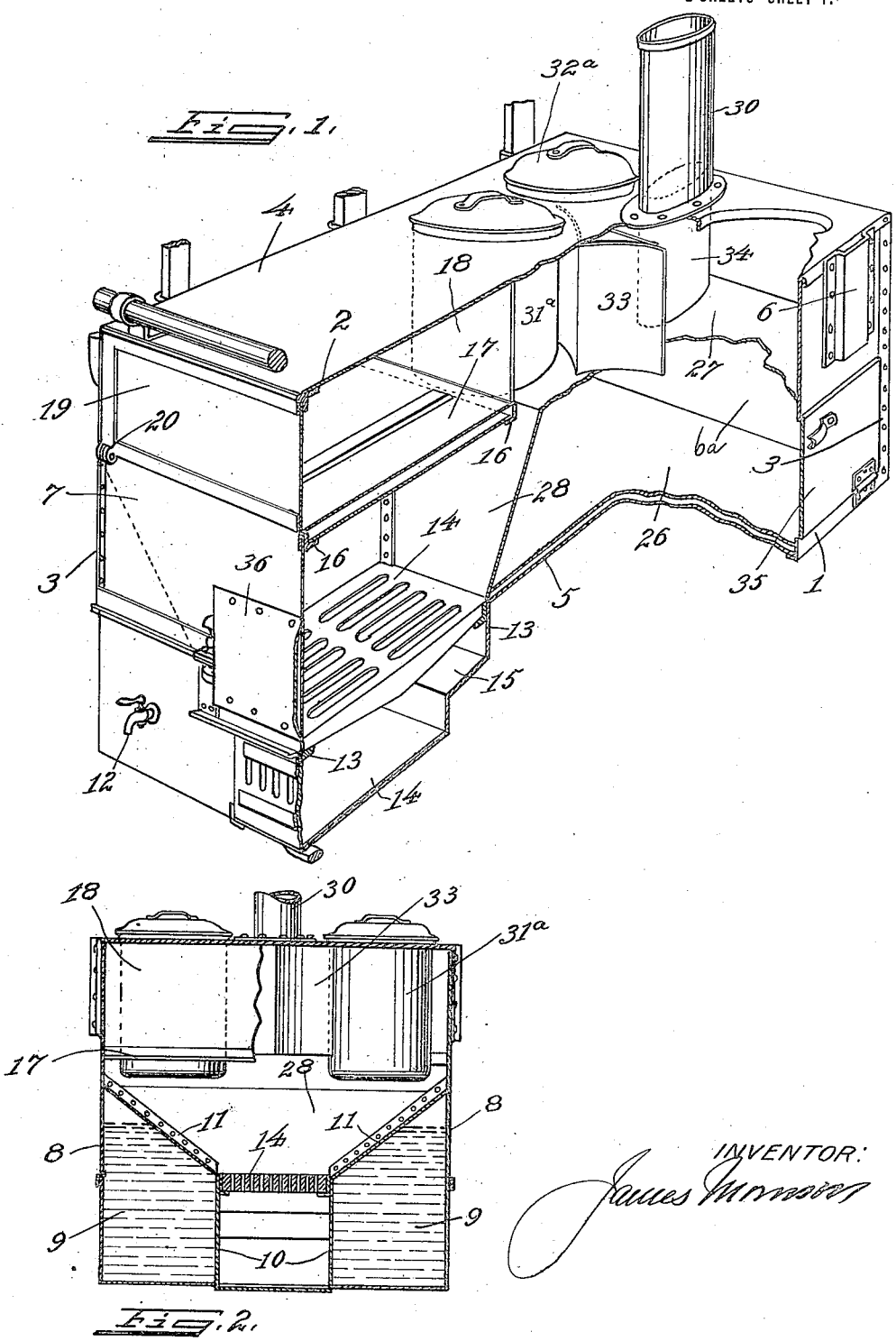

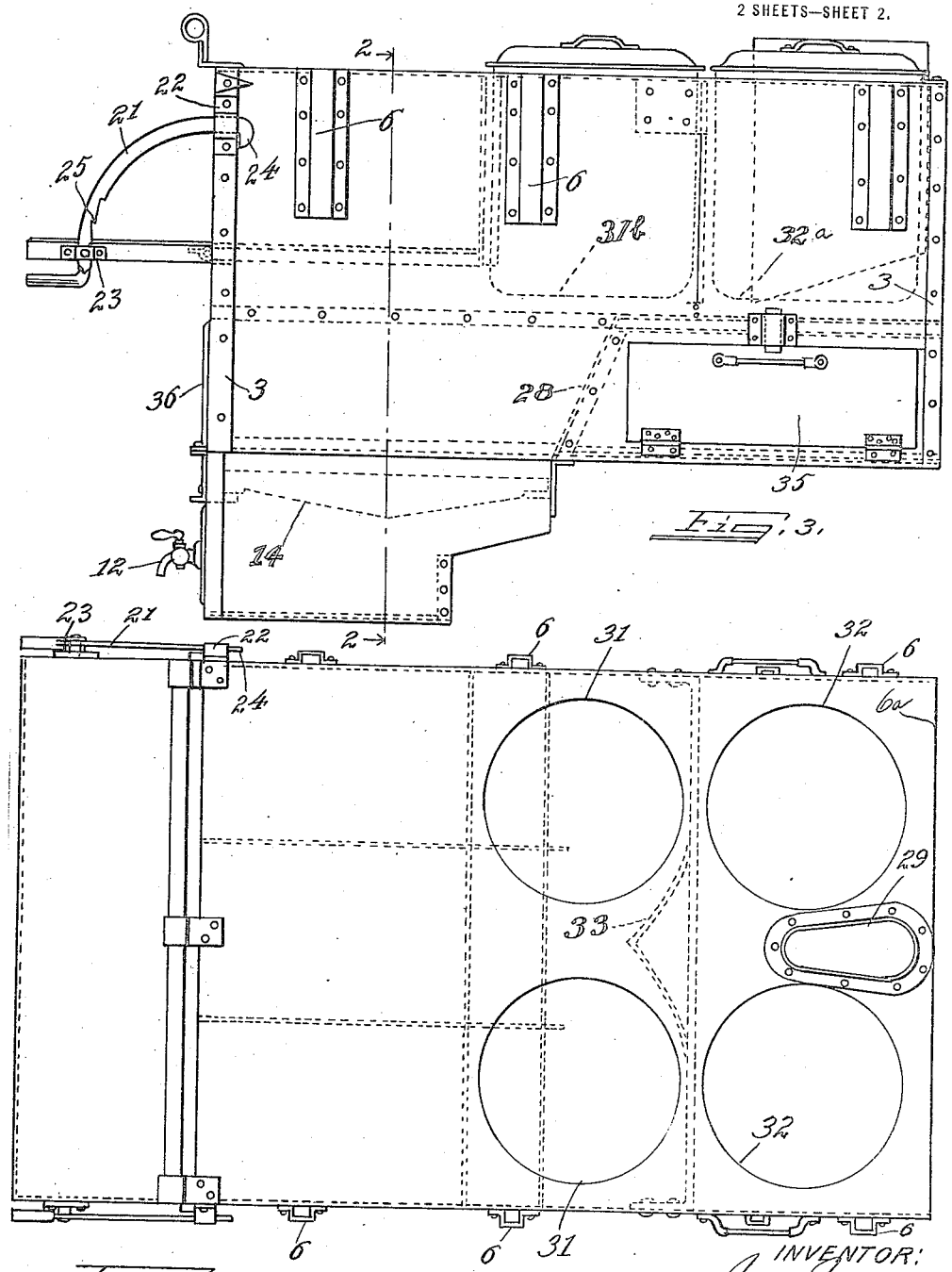

JAMES MORRISON, OF CINCINNATI, OHIO, ASSIGNOR TO THE TRAILMOBILE COMPANY, OF CINCINNATI, OHIO, A CORPORATION OF OHIO.

ROLLING KITCHEN.

1,422,603.   Specification of Letters Patent.   Patented July 11, 1922.

Application filed March 22, 1920. Serial No. 367,736.

*To all whom it may concern:*

Be it known that I, JAMES MORRISON, citizen of the United States, and a resident of the city of Cincinnati, in the county of Hamilton and State of Ohio, have invented certain new and useful Improvements in Rolling Kitchens, of which the following is a full, clear, and exact description, reference being made to the drawings forming a part of this specification.

My invention relates to rolling kitchens, such as are used by armies, in the field.

In this class of cooking device there are a great variety of structures which have been employed in the past, and many of which have been tested out in the recent European war, and the principal draw-back from all devices of which I have any knowledge, a defect clearly brought out in the experience of our Government in the said war, is that the various sorts of cooking cannot be done at the same time on any one device.

It is common in such cooking appliances to provide for heating water, baking bread, doing frying or the like and boiling soup, all at the same time, but these various sorts of cooking can all be done with substantially the same amount of heat. Proper cooking requires, however, different amounts of heat for some articles than others.

Thus to cook cereal and boil potatoes, with the same exposure to heat results in the burning of the cereal or the improper boiling of the potatoes. To get palatable foods of any variety and cook them at the same time with a single fire, is thus a problem which specially confronts the builder of army rolling kitchens.

It is my object, therefore, to provide a camp or rolling kitchen, which provides for different ranges of heat from the same fire, for doing delicate and rough cooking at one and the same time, whereby palatable food can be served, and a large number of men can be accommodated from a single cooking device, with a desirable variety of food.

This object and other advantages to be noted I accomplish by that certain construction and arrangement of parts to be hereinafter more specifically pointed out and claimed.

In the drawings,

Figure 1 is a perspective view of the interior of a device made according to my invention.

Figure 2 is a vertical cross section taken through the water heating compartments, on the line 2, 2, of Figure 3.

Figure 3 is a side elevation of the device.

Figure 4 is a top plan view of the device.

The frame-work of the device is made up in substantially rectangular shape out of heavy angle iron to which are riveted stout metal plates forming an enclosed box which is adapted to be mounted on the chassis of a motor vehicle or trailer vehicle.

Thus there are the base angle bars 1, the top angle bars 2 and the corner iron or angle bars 3. There is a top 4 on the structure and a base 5, a front 6$^a$ and a rear 7 formed of metal plates 8 riveted to the angle iron frame.

To facilitate the mounting of the device on any desired vehicle I provide stake pockets 6 which are riveted to the side plate of the structure.

As will be noted, the general plan of the device is to provide for a fire box at the rear central portion of the structure alongside of which fire box are two water tanks having sloping sides and over which fire box is a compartment for broiling and such other cooking as can be done under a very high temperature. At the forward half of the structure is an oven extending clear across side to side and available at either side for baking and above the oven space a series of vessels are mounted and adapted to receive varying degrees of heat, the smoke stack or flue being along the center line of the structure at the front. At the rear of the vehicle two water compartments 9 are formed between the side plates 8 of the device, inner plates 10, 10 which likewise form the walls of the ash trap box and sloping plates 11, 11, which form the sides of the fire box. These water compartments or tanks have taps 12 and provide a constant supply of hot water whenever a fire is kindled in the device. Supported on angle bars 13, 13, is the grate 14 for the fire, and the ash box is completed in addition to the plate 10 by means of a bottom plate 14 and an inner wall 15.

Above the grate there are mounted across the device angle bars 16, 16, which support a removable bottom 17, of the high heat cooking compartment. This compartment has an inner wall 18 and a door 19 at the rear of the structure mounted on hinges 20.

There are segments 21 which pass through clip plates 22 on the side of the device and 23 on the door thereby providing means for holding the door shut or permitting it to open with the ends 24 of the segments engaging behind the plates 22 when open, or when closed the notches 25 on the segment engaging behind said parts 22.

As so far described the structure corresponds generally to that of Patent 1,328,071, issued to Frank G. Baldwin, dated January 13, 1920.

The oven is formed between the side and front walls of the structure at the forward end thereof and its base comprises a plate 26 mounted over the base plate 5 of the structure and well insulated therefrom. The oven has a top plate 27 which extends from the front of the structure rearwardly to a point well forward from the wall 18 of the high heat cooking compartment. From this point it slopes down gradually at 28 to the grate bars 14. The flue 29 is, as has been stated, on the center line of the structure at the front thereof and has a pipe 30 extending upwardly therefrom and an extension 34, which depends to a point closely adjacent to the oven top.

Formed in the top plate 4 of the structure are the desired number of holes for the reception of cooking vessels. These holes are in two series, the holes 31 for cooking with high heat and the holes 32 for cooking with moderate heat, at the same time.

As shown, there are two of each of the holes, although this is not obligatory.

Between the two sets of cooking vessels is preferably located a baffle 33 which acts to prevent a direct flow of the products of combustion from the fire into contact with the vessels in the holes 32, but deflects them so that they flow to the sides of the casing and thence in and down to the flue.

The vessels in the holes 31 which are indicated at 31$^a$ are of a size and cross sectional area so that the bases 31$^b$ thereof act as a baffle to insure a large flow of products of combustion over the top of the oven. The baffle 33 does not reach down so far as the top 27 of the oven and serves additionally to direct the products of combustion against the top of the oven. The openings 31 are so positioned, however, that they come over the space between the wall 18 of the high heat cooking compartment and the angle in the top of the oven so that direct flame can contact with the sides of the vessels 31$^a$.

The vessels 32$^a$ are preferably of the same character as the vessels 31$^a$ and are mounted in the holes 32.

As may now be observed, the products of combustion from the fire and the direct radiation from the fire act to provide a very high heat to the cooking compartment at the rear of the structure. They also apply a high heat against the walls 28 of the oven and against the face of the vessels 31$^a$. Due to the conformation of the vessels 31$^a$ and the baffle 33 if provided, the products of combustion will, in a large portion pass over the top of the oven, thereby providing additional heat thereto.

During the passage of the products around the vessel 31$^a$ and over the top of the oven and around the baffle 33, considerable of the heat is abstracted so that when the said product reaches the front part of the device so as to apply heat to the vessels 32$^a$ they are considerably reduced in temperature, thereby permitting the simultaneous cooking of foods at a mild heat and at a fairly high heat and at a position closely adjacent to the fire at an extremely high heat.

Not only this but an oven is provided in which baking can be done with the vessels 31$^a$ and 32$^a$ serving as a partial baffle to insure a definite passage of products of combustion over the top of said oven.

The oven has any desired form of door 35 and the fire box has any desired form of door 36.

The baffle 33 being in line with the flue and being pointed rearwardly causes the products of combustion that are deflected to pass out towards the sides of the structure, and then back past the vessels 32$^a$ in order to reach the flue.

It is not desired that my failure above to point out equivalent structures to those specifically described be construed as limitations of the claims that follow. On the contrary I desire my claims to be construed with the full application of the doctrine of equivalents.

Having thus described my invention, what I claim as new and desire to secure by Letters Patent, is:—

1. In a rolling military kitchen, the combination of a substantially rectangular frame and shell, with the interior of the shell at the rear divided into a fire box, two water compartments and a cooker above the fire box and the interior of the shell at the front divided into a single oven transverse the shell having a back wall forming part of the fire box, a plurality of supports for vessels for cooking formed in the top of the shell, a flue for the escape of products of combustion, vessels for cooking on the supports, said vessels presenting their lower surfaces as baffles to enforce a passage of products of combustion over the top of the oven before reaching the flue, said cooker division of the fire box terminating short of the oven back wall, whereby the vessels receive direct heat and the oven top does also.

2. In a rolling military kitchen, the combination of a substantially rectangular frame and shell, with the interior of the shell at the rear divided into a fire box, two water compartments and a cooker above the fire box and the interior of the shell at the front divided into a single oven transverse the shell, a plurality of supports for vessels for cooking, a flue for the escape of products of combustion, vessels for cooking on the supports, said vessels presenting their lower surfaces as baffles to enforce a passage of products of combustion over the top of the oven before reaching the flue, and means surrounding the flue opening and depending to a point adjacent the top of the oven to lower the point of uptake of the flue.

3. In a device of the character described, the combination with the casing of the device of a fire box therein, a high heat compartment directly over the fire box, an oven positioned laterally of the fire box having a back wall forming part of the fire box, a flue, a series of cooking vessels supported in the casing over the oven in the casing in the direct path of the products of combustion, and another series of vessels located between said first series and the flue and a baffle between the two series of vessels, to prevent access of products of combustion to the second series of vessels without first passing around the first series, the bases of said vessels acting as baffles to maintain the products of combustion against the top of the oven lying directly beneath said bases and the base of the high heat compartment terminating short of the top of the oven, as and for the purpose described.

JAMES MORRISON.